(12) United States Patent
Wong (10) Patent No.: US 6,300,696 B1
(45) Date of Patent: Oct. 9, 2001

(54) SMALL ELECTRIC MOTOR

(75) Inventor: Ben To Fan Wong, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 09/522,177

(22) Filed: Mar. 9, 2000

(30) Foreign Application Priority Data

Mar. 9, 1999 (GB) .................................................. 9905247

(51) Int. Cl.[7] .......................... H02K 11/02; H02K 23/00; H02K 11/00
(52) U.S. Cl. ................... 310/68 R; 310/71; 310/40 MM; 310/89; 310/68 C; 310/239; 310/72
(58) Field of Search .................... 310/71, 40 MM, 310/238, 239, 89, 72, 68 R, 68 C, 67 R (56) References Cited

U.S. PATENT DOCUMENTS

| | | | |
|---|---|---|---|
| 4,613,781 | * | 9/1986 | Sanders ................................. 310/239 |
| 5,196,750 | * | 3/1993 | Strobl ................................... 310/239 |
| 5,281,876 | | 1/1994 | Sato ............................... 310/40 MM |
| 5,563,462 | * | 10/1996 | Strobl et al. ........................... 310/71 |
| 5,598,045 | * | 1/1997 | Ohtake et al. .................. 310/40 MM |
| 5,600,193 | * | 2/1997 | Matsushima et al. ............. 310/68 C |
| 5,633,542 | * | 5/1997 | Yuhi et al. ...................... 310/40 MM |
| 5,942,819 | * | 8/1999 | Burgess et al. ........................ 310/51 |

FOREIGN PATENT DOCUMENTS

| | | | |
|---|---|---|---|
| 4430225A | 6/1995 | (DE) | ................................. H02K/5/04 |
| 0509683A | 10/1992 | (EP) | ................................ H02K/11/00 |
| 0607032A | 7/1994 | (EP) | ................................ H02K/11/00 |
| 0607032A1 | 7/1994 | (EP) | ................................ H02K/11/00 |
| 2330954A | 5/1999 | (GB) | ................................ H02K/11/00 |
| A8-0064405 | 3/1996 | (JP) | ................................ H02K/11/02 |

* cited by examiner

Primary Examiner—Burton S. Mullins (57) ABSTRACT

A miniature electric motor has a tubular housing with a closed end and an open end. The open end is closed by an end cap assembly. The end cap assembly comprises an end cap supporting two motor terminals and two brush assemblies. A chip capacitor is connected between the motor terminals. The positive motor terminal is connected to the positive brush assembly by a choke and the negative motor terminal is connected to the negative brush assembly by a PTC. The negative motor terminal is also connected to the motor housing by an earth strap which is nipped between the end cap and the motor housing.

15 Claims, 7 Drawing Sheets

SMALL ELECTRIC MOTOR

BACKGROUND OF THE INVENTION

This invention relates to small electric motors and in particular, to the end cap assembly for an electric motor of a direct current permanent magnet stator type.

RELATED ART

It is often desired to reduce the amount of electrical noise generated by an electric motor. This is done by adding a capacitor or other electronic components to the motor circuit. Typically, a capacitor is connected between the motor terminals and because of their size, the capacitor is mounted on the outside of the motor where it is subject to physical damage. With the advent of chip-type capacitors, it has been possible to fit the capacitor to the inside of the motor end cap. One such arrangement is shown in EP 0607032 A1 where a chip capacitor is pressed into contact with a motor terminal by a conductive spring bearing against the other terminal, like a battery in a torch. While this is very simple, it does require the assembly of the chip and the spring into a slot in the end cap.

SUMMARY OF THE INVENTION

The present invention aims to simplify assembly even further by eliminating the need for the separate spring. Certain embodiments build upon the compact nature of the end cap by incorporating further noise suppression or motor protection devices such as chokes, surge suppressors and overcurrent/overtemperature protection devices.

Accordingly, the present invention provides a miniature electric motor comprising a housing having an open end; a permanent magnet stator fitted to the housing; a rotor having an armature and a commutator; an end cap engaging the open end of the housing; two brush assemblies supported by the end cap and including brushes in sliding contact with the commutator; two motor terminals connected to the brush assemblies and supported by the end cap; bearings supporting the rotor for rotation in the housing; and a chip capacitor supported by the end cap; wherein resilient contact means integral with the motor terminals directly engage respective side portions of terminal ends of the chip capacitor.

Preferably, the chip capacitor is disposed in a groove in the end cap. The use of a groove helps to locate the capacitor during assembly.

Preferably, the resilient contact means are fingers. The use of fingers extending from the motor terminals and engaging a side of the respective terminal ends of the chip capacitor has the advantage of being less sensitive to variations in the length of the chip as while the thickness of the chip is controlled, the length can vary significantly due to manufacturing tolerances.

Preferably, the fingers of the motor terminals engage an outer longitudinal edge of the terminal ends of the chip capacitor. If the capacitor is disposed in a groove in the end cap this will cause the chip capacitor to pivot within the groove and partially blocking the groove thereby making resilient contact with the capacitor and retaining it within the groove.

Preferably, the end cap assembly includes a choke connected between one brush terminal and one motor terminal.

Preferably, the end cap assembly includes a positive temperature coefficient thermistor connected between one motor terminal and one brush assembly.

Preferably, the motor terminals are female terminals supported by respective terminal posts integral with the end cap. Female terminals make for a more compact motor but add considerably to the space constraints within the end cap.

Preferably, the terminal posts are substantially triangular in section. This arrangement allows the contact portion of the motor terminal a wide range of resilient movement while supporting it against excessive movement which would deform the terminal.

Preferably, the motor housing and end cap have two flat sides connected by two arcuate sides and the motor terminals are located along one of the flat sides. Alternatively, the motor terminals may be located along one of the arcuate sides of the end cap assembly.

BRIEF DESCRIPTION OF THE INVENTION

Two preferred embodiments of the invention will now be described, by way of example only, with reference to the accompanying drawings, in which.

DETAILED DESCRIPTION OF THE PREFERRED EMBODIMENT

Figure 1:
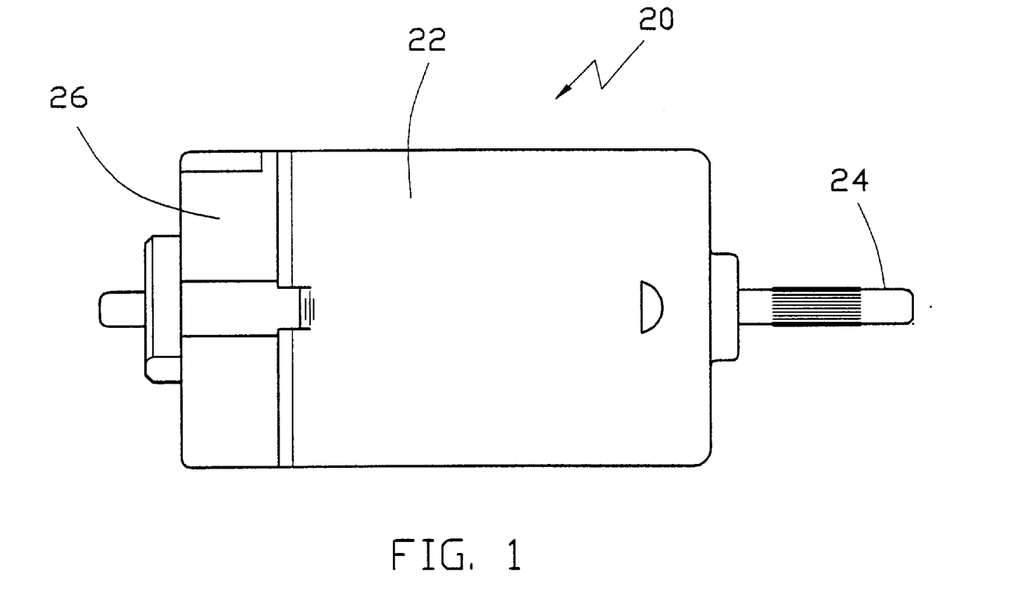
FIG. 1 is a view of a motor according to the present invention.

FIG. 1 illustrates a miniature d.c. motor 20 having a wound rotor and a permanent magnet stator. The motor has a housing 22 in the form of a deep drawn can with a closed end and an open end. The housing 22 houses a permanent magnet stator which surrounds a wound rotor fitted to a motor shaft 24. An end cap 26 closes the open end of the housing and supports motor terminals, brush gear and other components. The housing 22 and thus, the end cap 26, has two flat sides interconnected by two arcuate sides.

Figure 2:
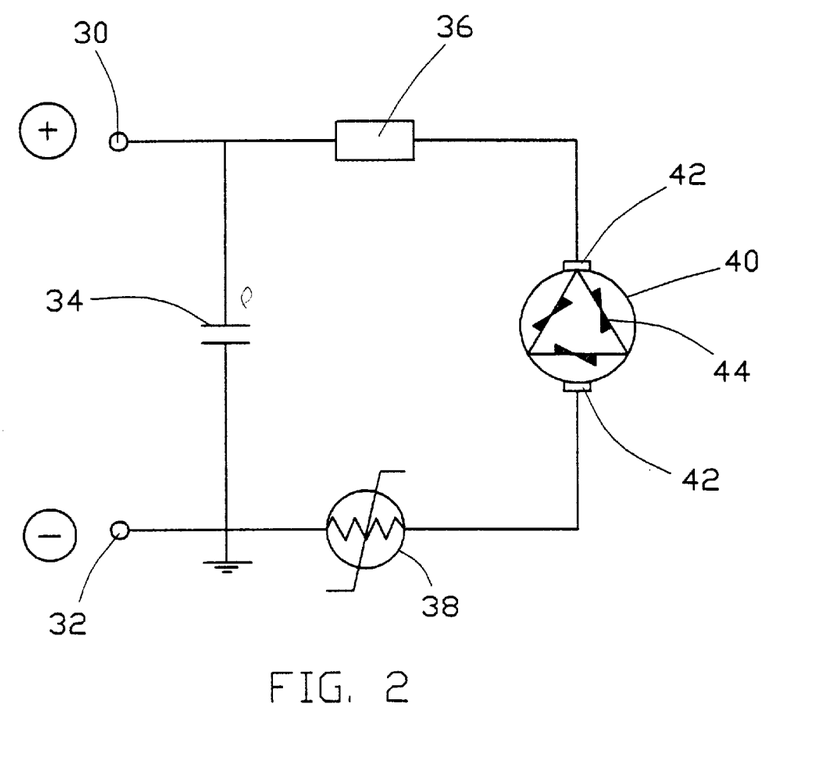
FIG. 2 is a circuit diagram of the motor of FIG. 1.

FIG. 2 is a circuit diagram of the motor illustrating the electrical components and their interconnections. From this diagram, it can be seen that there is a positive motor terminal 30 and a negative motor terminal 32. A capacitor 34 is connected between the two terminals. A choke 36 is connected to the positive terminal 30 and a PTC (positive temperature coefficient thermistor) 38 is connected to the negative motor terminal 32. The choke 36 and PTC 38 are connected to a rotor 40 via brushes 42 rubbing on a commutator. The rotor 40 is fitted with a varistor 44. The negative terminal 32 is also earthed which means it is connected to the motor housing.

Figure 3:
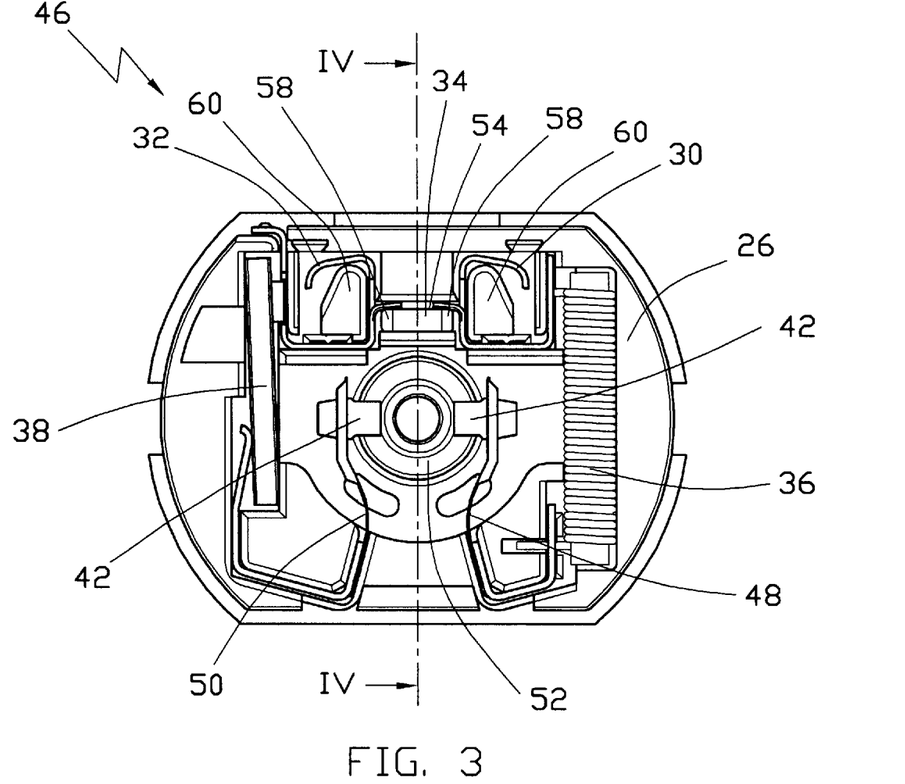
FIG. 3 is an inside view of an end cap assembly of the motor of FIG. 1.
Figure 4:
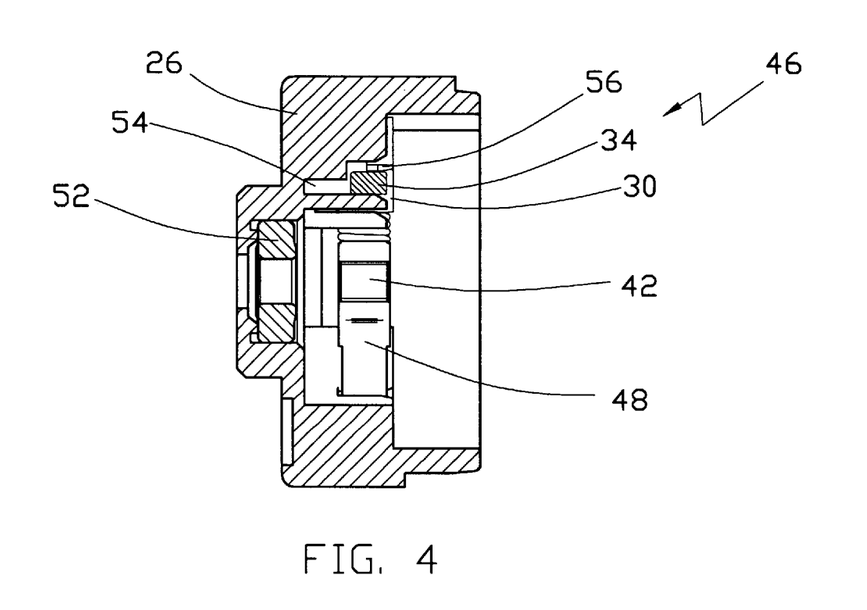
FIG. 4 is a sectional view of the end cap assembly of FIG. 3.

FIG. 3 shows the inside of an end cap assembly 46 of the motor of FIG. 1 while FIG. 4 is a sectional view cut along line IV—IV of FIG. 3. As can be seen, the end cap assembly 46 is very compact and comprises a plastic material end cap 26 supporting positive and negative motor terminals 30, 32, a chip-type capacitor 34, a choke 36, a PTC 38, two brush assemblies 48, 50 and a bearing 52. The chip capacitor 34 is located in a groove 54 in the end cap between the two motor terminals. Each motor terminal 30, 32 has a limb 56 which extends into the groove 54 and makes contact with an edge or corner region of a respective terminal end 58 of the chip capacitor 34, urging the capacitor into contact with a wall of the groove 54 and pivoting the capacitor slightly within the groove, thus holding the capacitor more securely.

Each motor terminal 30, 32 is of the female type and is located about a terminal post 60 which protects the motor terminals from an overly aggressive insertion of a male terminal. The terminal posts 60 are substantially triangular in plan allowing a contact arm 62 of each motor terminal a large range of motion while supporting the arm against overbending which would permanently bend the contact arm reducing its spring contact force and thus, reliability.

Figure 5:
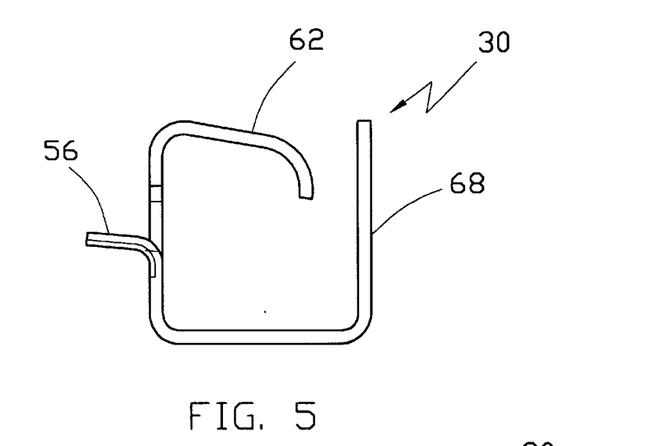
FIG. 5 is a plan view of a positive terminal of the end cap assembly of FIG. 3.
Figure 6:
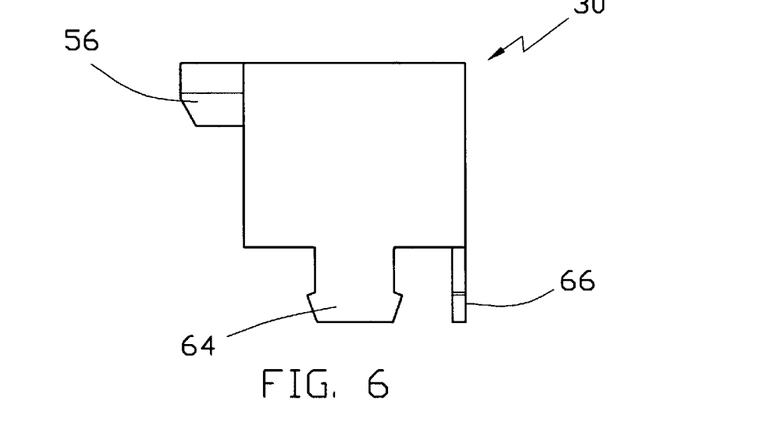
FIG. 6 is a side view of the positive terminal of FIG. 5.

The positive motor terminal 30 is shown in FIGS. 5 and 6 where it can be seen that the terminal is shaped from a strip of sheet material and bent into a square shape with the limb/capacitor terminal 56 extending from one side. In FIG. 6, two barbs 64, 66 are visible. The barbs extend into and engage recesses in the end cap to hold the terminal in place. The barb 66 on the end portion 68 is also used as a terminal for connection to the choke.

Figure 7:
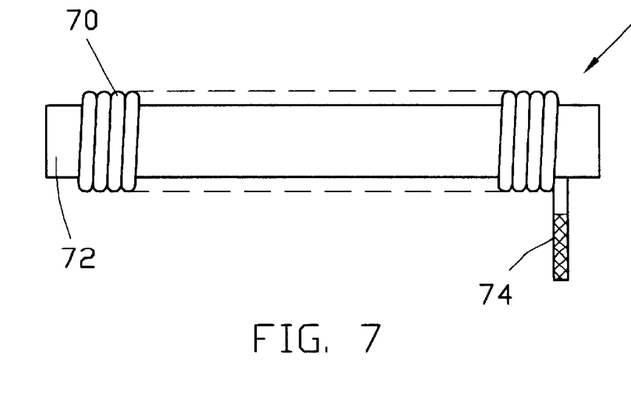
FIG. 7 is a side view of a choke of the end cap assembly of FIG. 3.
Figure 8:
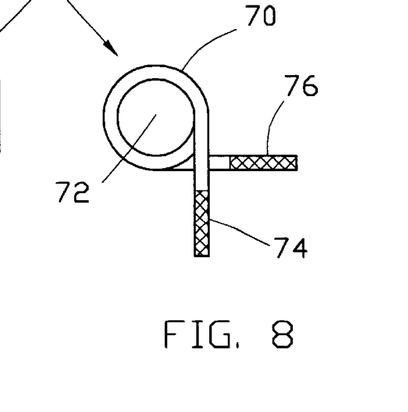
FIG. 8 is an end view of the choke of FIG. 7.

The choke 36, shown in FIGS. 7 and 8, is a length of enameled copper wire 70 wound around a ferrite rod 72. The ends 74, 76 of the copper wire, also known as the leads of the choke, are tinned by dipping in solder to remove the insulating enamel. The terminal end lead 74 of the choke is placed in the second groove of the positive terminal and then the positive terminal is pressed into the end cap, the choke lead 74 being nipped between the groove and the second barb 66 ensuring a good, stable electrical contact.

Figure 9:
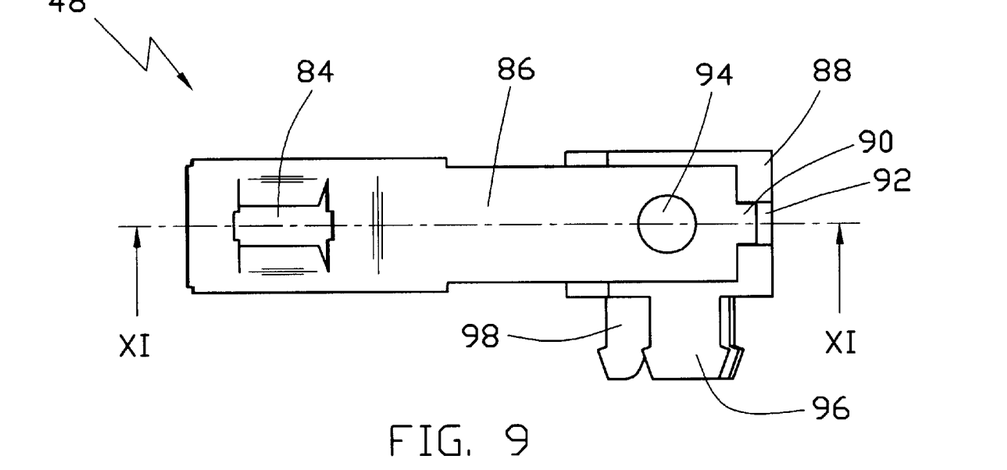
FIG. 9 is a side view of a positive brush assembly, without a brush, of the end cap assembly of FIG. 3.
Figure 10:
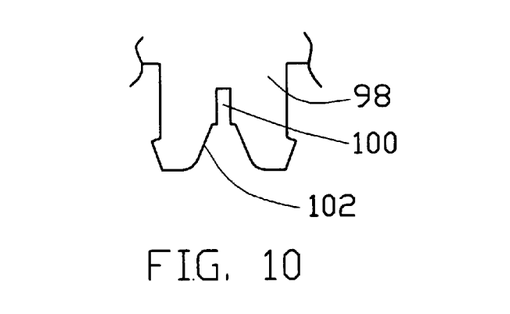
FIG. 10 is a partial view of the positive brush assembly of FIG. 9 showing in detail a connector for a choke lead.
Figure 11:
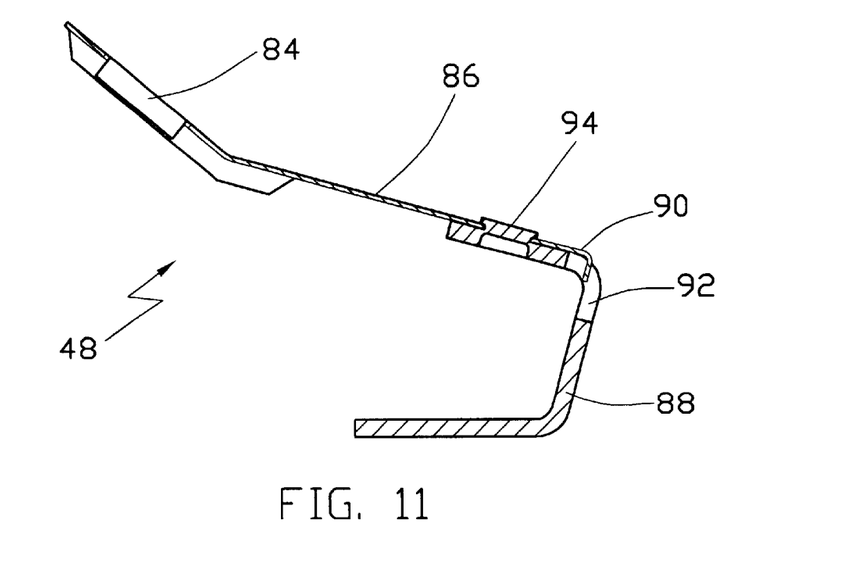
FIG. 11 is a sectional view from below of the brush assembly of FIG. 9.

The choke 36 is located in another groove 78 in the end cap (see FIG. 3). The brush end lead 76 of the choke is located in a small lateral extension 80 of the groove 78 for connecting to the positive brush assembly 48. The brush assembly 48 comprises a brush 42 of carbon based material pressed into a receiving aperture 84 of a resilient conductive brush arm 86. The brush arm 86 is upset riveted to a brush base 88. The assembly 48 without the brush is shown in FIGS. 9 and 11. A small tail 90 extends from the proximal end of the brush arm 86 and locates in an aperture 92 in the brush base 88 to prevent the brush arm 86 pivoting about the rivet 94. The brush base 88 has two barbs 96, 98 which extend into grooves in the end cap to hold the brush assembly in place. The second barb 98 which is partly obscured in FIG. 9 and shown in detail in FIG. 10 has a central slot 100 with a tapered mouth 102. This barb 98 forms a choke terminal and is pressed over the terminal end lead 76 of the choke 36 to make a reliable electrical connection between the positive brush assembly 48 and the choke 36.

Figure 12:
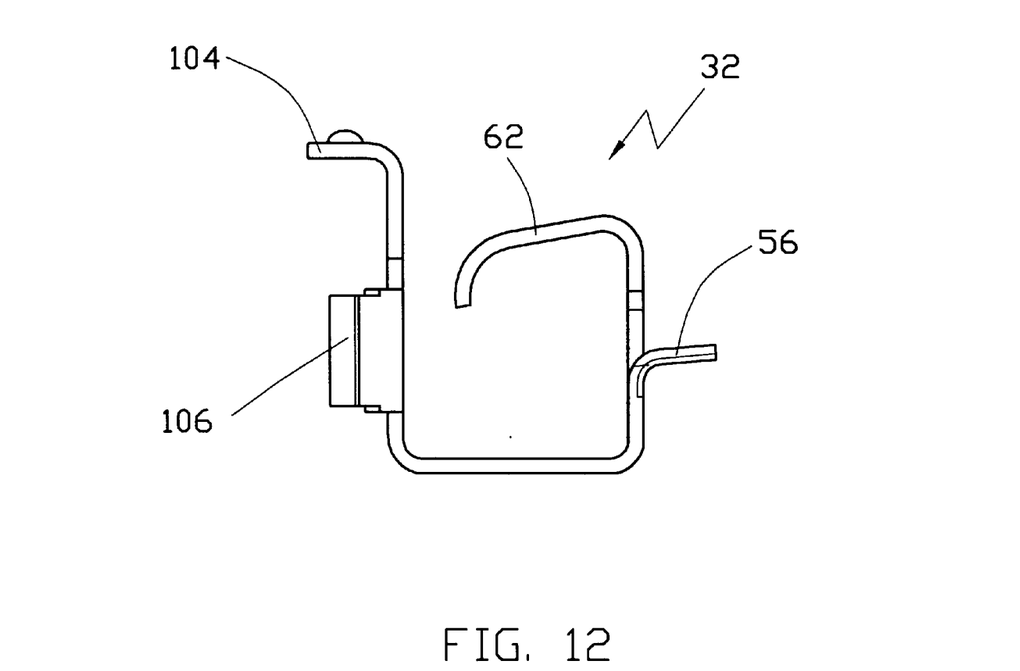
FIG. 12 is a plan view of a negative motor terminal of the end cap assembly of FIG. 3.
Figure 13:
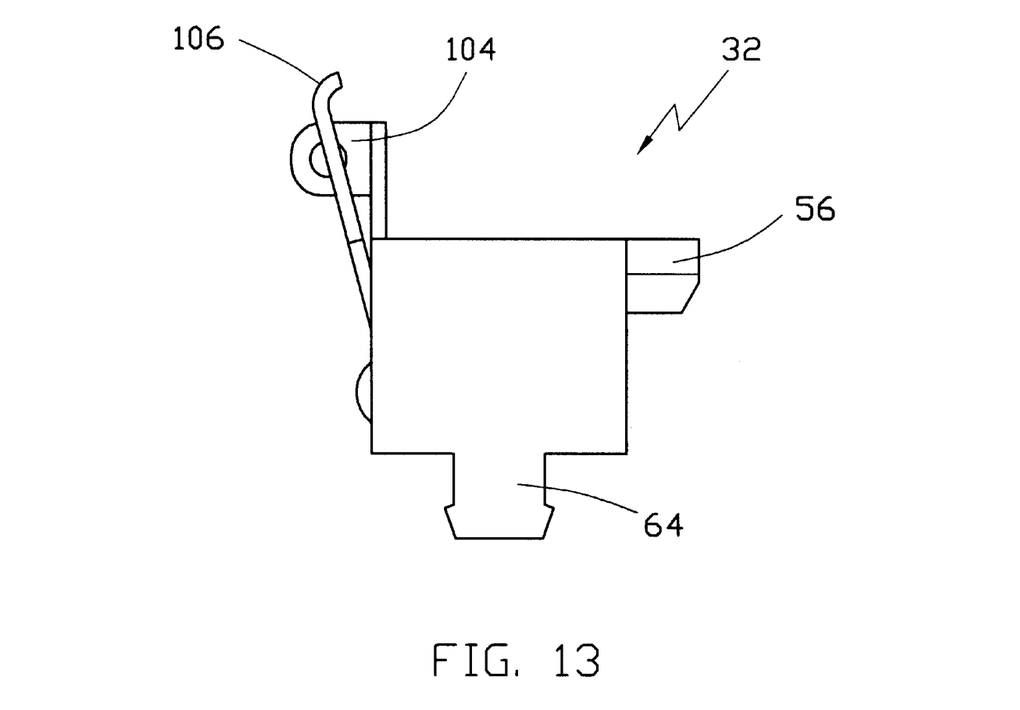
FIG. 13 is a side view of the negative motor terminal of FIG. 12.

The negative motor terminal 32 is shown in FIGS. 12 and 13. The negative terminal 32 is similar to the positive terminal 30 being somewhat square in plan view with the contact arm end 62 and limb/capacitor terminal 56 being a mirror image of the corresponding portions of the positive terminal 30. This motor terminal 32 has a single barb 64 extending from a midsection of the negative terminal 32 into a groove in the end cap to secure the terminal 26 in place. The other end of the terminal 32 has an extension forming an earth strap 104 which passes through a recess in the end cap 26 to the exterior surface of the end cap 26 so that when fitted to the housing 22, the earth strap 104 is nipped between the end cap 26 and the housing 22 to electrically connect the negative terminal to the housing 22.

Adjacent the earth strap 104 is another limb extending upwardly and outwardly. This limb forms a PTC terminal 106 for making a resilient connection with a contact surface of PTC 38. PTC 38 is a slab like metal-polymer-metal type positive temperature coefficient thermistor having parallel planar contact surfaces on opposite surfaces of the slab. The other contact surface is electrically connected to the negative brush assembly 50.

Figure 14:
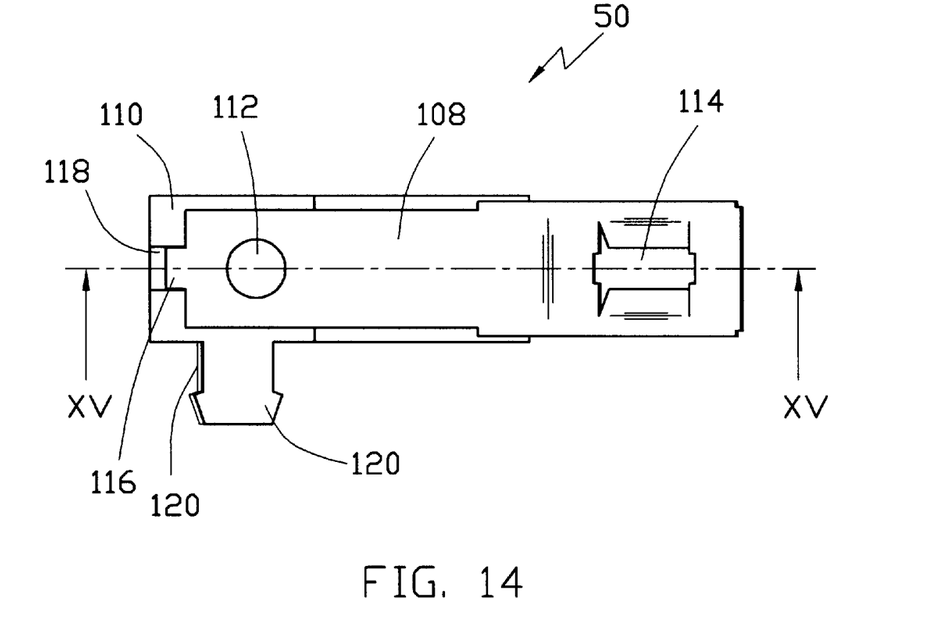
FIG. 14 is a side view of a negative brush assembly, without a brush, of the end cap assembly of FIG. 3.
Figure 15:
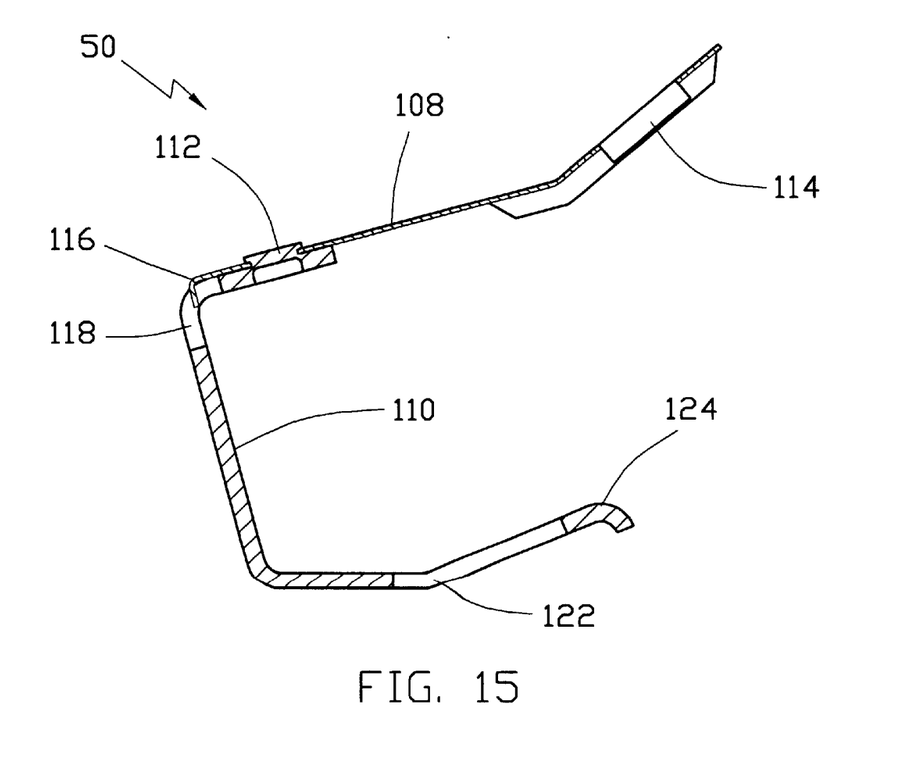
FIG. 15 is a sectional view of the negative brush assembly of FIG. 14 without the brush.

The negative brush assembly 50 is similar in construction to the positive brush assembly 48 with two main exceptions as shown in FIGS. 14 and 15 where the negative brush assembly 50 is shown without its brush. The assembly comprises a brush arm 108 held to a brush base 110 by an upset rivet 112. The brush arm 108 has an aperture 114 for receiving and holding the brush and a tail 116 which engages an aperture 118 in the base 110 to prevent t he brush pivoting about the rivet 112. The brush base 110 has two barbs 120 which engage grooves in the end cap 26 to secure the brush assembly in position in the end cap 26. Unlike in the positive brush assembly 48, neither barb 120 is slotted although one barb is obscured by the other in FIG. 14. Another difference is that the negative brush assembly 50 has a limb, extending from the end of the brush base 110 remote from the brush arm 108, forming a PTC terminal 122. The PTC terminal 122 is a resiliently flexible limb having a contact portion 124 arranged to bear against the other contact terminal of the PiC as shown in the end cap assembly 46 assembly of FIG. 3.

Figure 16:
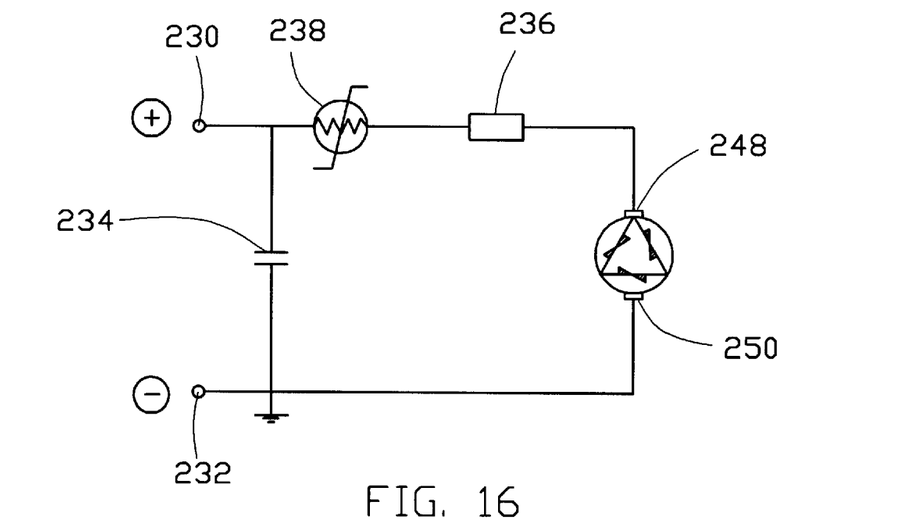
FIG. 16 is a motor circuit diagram of an alternative motor arrangement.

In the embodiment described thus far, the motor terminals are located along one of the flat edges/sides of the end cap. For some cases, it is desirable for the motor terminals to extend from one of the arcuate edges/sides of the end cap. This involves rearranging the components and in one such assembly, the circuit diagram may be as shown in FIG. 16 where the PTC 238 is connected between the positive motor terminal 230 and the choke 236 with the negative motor terminal 232 being connected directly to the negative brush assembly 250. Chip capacitor 234 is connected between the two motor terminals. Such an end cap assembly is shown in FIG. 17.

Figure 17:
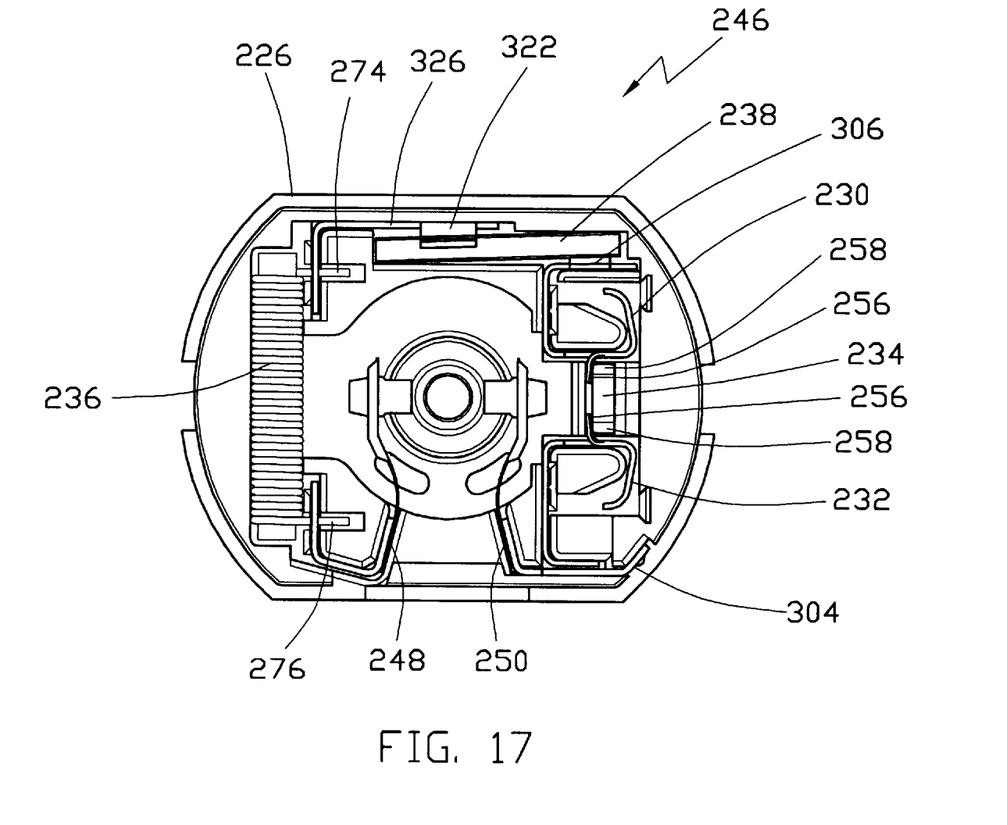
FIG. 17 is a view similar to FIG. 3 of an alternative end cap assembly for the motor of FIG. 16.

The end cap assembly 246 of FIG. 17 has an end cap 226 supporting positive and negative motor terminals 230, 232, a capacitor 234, a choke 236, a PTC 238 and positive and negative brush assemblies 248, 250.

The capacitor 234 is located in a groove between the two motor terminals 230, 232. Each motor terminal has a limb forming a capacitor terminal 256 making contact with a side of a terminal end 258 of the chip-type capacitor 234.

The positive motor terminal 230 has a limb forming a PTC terminal 306 for making resilient contact with the PTC.

This is similar to the PTC terminal 122 formed in the negative motor terminal 50 of the first embodiment.

The choke 236 is connected to the positive brush assembly 248 in a manner similar to that of the first embodiment, that is, by a slotted barb on the brush base of the positive brush assembly 248.

The choke and PTC are connected together by a link connection 326. Link 326 has a slotted barb similar to that of the positive brush base of the first embodiment for connecting with choke lead 274. Link 326 also has a limb forming a PTC terminal 322 for resilient electrical contact with the PTC 238.

The negative motor terminal 232 makes direct contact with the brush base 250 of the negative brush assembly. An extension of the free end of the brush base 250 forms the earth strap 304 for connecting the negative motor terminal 232 to the motor housing. Both embodiments function the same way.

Although two embodiments have been described, other variations and modifications will be apparent to those skilled in the art without departing from the spirit of the invention. For example, the chip capacitor may not be located in a groove in the end cap but merely pressed against a wall formed as part of the end cap by the resilient contact members. It is intended that all such variations and modifications will be covered by the invention as defined by the following claims.

What is claimed is:

1. A miniature electric motor comprising a housing having an open end;

a permanent magnet stator fitted to the housing;

a rotor having an armature and a commutator;

an end cap engaging the open end of the housing;

two brush assemblies supported by the end cap and including brushes in sliding contact with the commutator;

two motor terminals connected to the brush assemblies and supported by the end cap;

bearings supporting the rotor for rotation in the housing;

a chip capacitor supported by the end cap, the chip capacitor having terminal ends and having at least one side that includes a portion of each of the terminal ends; and resilient contact members integral with the motor terminals, the resilient contact members directly and resiliently engaging respective side portions of the terminal ends of the chip capacitor along the at least one side.

2. The motor of claim 1, wherein the chip capacitor is disposed in a groove in the end cap.

3. The motor of claim 1, wherein the resilient contact members are fingers.

4. The motor of claim 3, wherein the fingers of the motor terminals engage an outer edge of the side of the respective terminal ends of the chip capacitor.

5. The motor of claim 1, wherein the motor terminals are female type terminals mounted about terminal posts and held to the end cap by barbs.

6. The motor of claim 5, wherein the terminal posts are substantially triangular in section.

7. The motor of claim 1, wherein the end cap has two flat sides connected by two arcuate sides and the motor terminals are located on one flat side.

8. The motor of claim 1, wherein the end cap has two flat sides joined by two arcuate sides and the motor terminals are located on one arcuate side.

9. The motor of claim 1, wherein one of the motor terminals is connected to one of the brush assemblies via a positive temperature coefficient thermistor.

10. The motor of claim 1, wherein one of the motor terminals is connected to one of the brush assemblies via a choke.

11. The motor of claim 10, wherein the brush assembly connected to the choke has a barb for engaging a groove in the end cap for securing the brush assembly to the end cap and the barb has a slot which straddles and grips a lead from the choke to establish electrical contact therewith.

12. The motor of claim 11, wherein the motor terminal connected to the choke has a barb which engages a groove in the end cap and the lead from the choke is disposed in the groove so as to be nipped between the groove and the barb of the terminal to establish electrical contact therewith.

13. The motor of claim 1, wherein one of the motor terminals is connected to one of the brush assemblies by a positive temperature coefficient thermistor and a choke.

14. The motor of claim 1, wherein one of the motor terminals is connected to the motor housing by way of a limb extending from the motor terminal through a recess in the end cap, wherein the limb is nipped between the end cap and the motor housing.

15. The motor of claim 1, wherein one of the motor terminals makes direct contact with one of the brush assemblies and the brush assembly includes a brush base fixed to the end cap and supporting a resilient brush arm urging the brush into contact with the commutator, the brush base having further a limb extending through a recess in the end cap, wherein the limb is nipped between the end cap and the motor housing.

* * * * *